United States Patent
Wittrisch et al.

[11] Patent Number: 5,864,099
[45] Date of Patent: Jan. 26, 1999

[54] DEVICE FOR COUPLING A RECEIVER SYSTEM WITH THE WALL OF A WELL

[75] Inventors: Christian Wittrisch, Rueil Malmaison; Jean-Paul Deflandre, Ermont, both of France

[73] Assignee: Institut Francais du Petrole, Cedex, France

[21] Appl. No.: 921,008

[22] Filed: Aug. 29, 1997

[30] Foreign Application Priority Data

Sep. 2, 1996 [FR] France ................................. 96 10752

[51] Int. Cl.⁶ ........................................ G01V 1/40
[52] U.S. Cl. ...................... 181/102; 340/856.2; 367/25; 166/206
[58] Field of Search ..................... 181/102, 104; 166/336, 381, 382, 385, 206; 367/25; 340/856.2

[56] References Cited

U.S. PATENT DOCUMENTS

| | | |
|---|---|---|
| 3,182,724 | 5/1965 | Shore ...................................... 166/206 |
| 3,978,939 | 9/1976 | Trouiller . |
| 4,898,237 | 2/1990 | Wittrisch ................................. 166/206 |
| 5,027,918 | 7/1991 | Cole . |
| 5,259,452 | 11/1993 | Wittrisch . |
| 5,318,129 | 6/1994 | Wittrisch ................................. 166/336 |

FOREIGN PATENT DOCUMENTS

| | | |
|---|---|---|
| 0 303 536 | 2/1989 | European Pat. Off. . |
| 0 409 361 | 1/1991 | European Pat. Off. . |

*Primary Examiner*—Khanh Dang
*Attorney, Agent, or Firm*—Millen, White, Zelano & Branigan, P.C.

[57] ABSTRACT

A device for coupling a receiver system with the wall of a well (1) bored in the ground comprises at least one sensor (11;12) sensitive to vibrations, structure (14,15) for applying the system against the wall of said well at the two ends of the system. A surface for supporting the system against the wall, arranged between the applying structure, has a radius of curvature essentially identical to the radius of curvature of a transverse section of the well so that this contact surface (MN) between said system and the wall follows a portion of a cylinder contained within an arc equal to at least 90°.

15 Claims, 2 Drawing Sheets

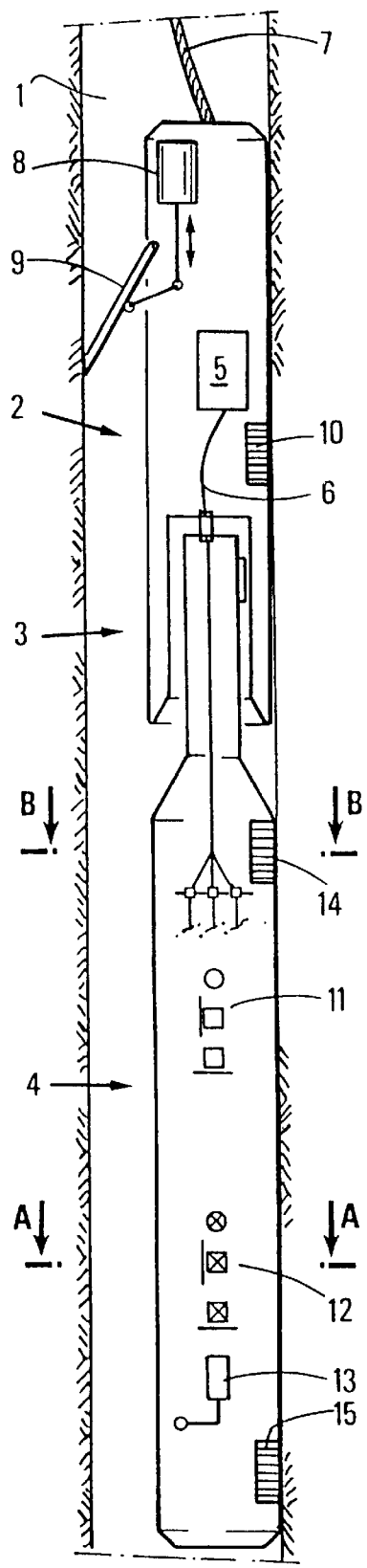
FIG. 1
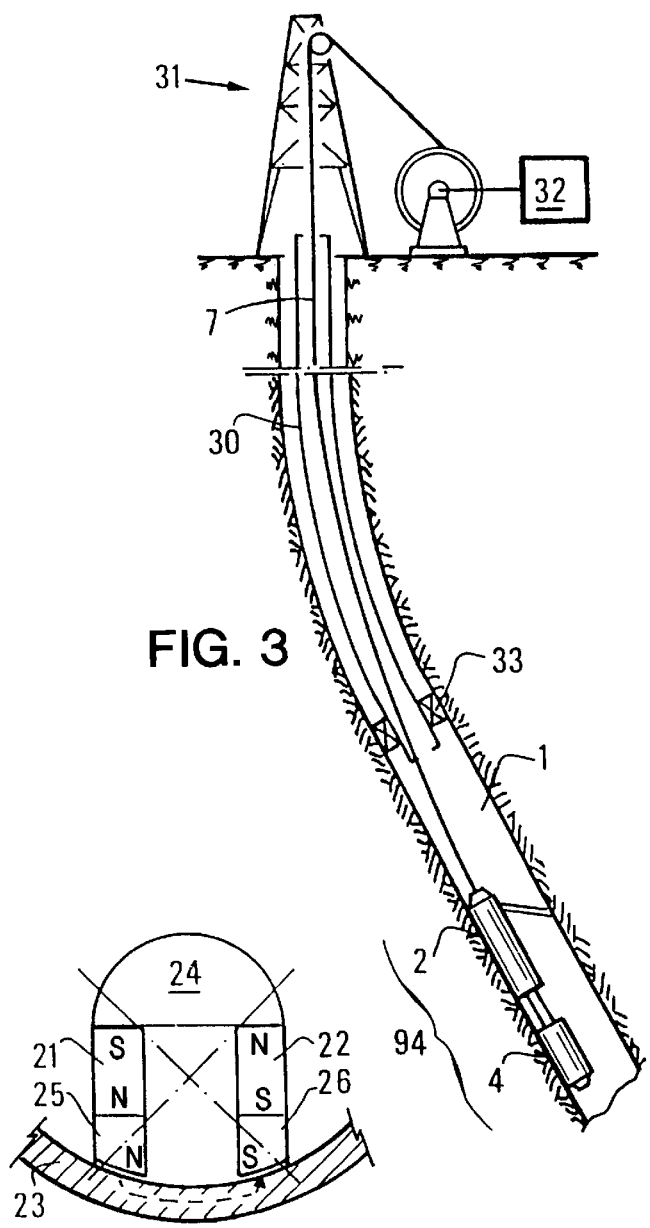
FIG. 3
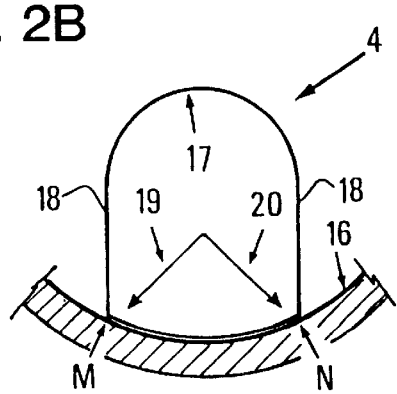
FIG. 2B
FIG. 2A

DEVICE FOR COUPLING A RECEIVER SYSTEM WITH THE WALL OF A WELL

FIELD OF THE INVENTION

The present invention relates to an improved device for coupling a receiver system with the wall of a well producing petroleum effluents. By preference, the receiver system uses sensors of the accelerometer type and/or geophones.

OBJECTIVES OF THE INVENTION

The objective of the present invention is to improve the frequency response of the receiver system. The receiver system is said to be correctly coupled when the frequency response of the system and the frequency or frequencies measured by the receiver system are the same as or close to the frequencies of the excitation signal arriving from the formation. If this is not the case, the receiver system has its own resonance modes and the effect of these is that in the event of an excitation of the mono-frequency type, for example, the system responds with multiple frequencies of amplitudes which are often as high as that of the excitation signal. This means that the signal picked up by the system can not be used.

If the system is improved in this respect, it will be suitable for taking measurements in narrow bores where the receiver system will therefore be of a small diameter and therefore light-weight.

There are numerous applications in which such a system can be used. It can be used to detect vibrations generated in the audio band by rocks in the geological formation in the vicinity of the well when subjected to hydraulic fracturing, during the time when pumping operations are being conducted in the well subsequent to such fracturing, during periods of injection pumping or whilst the well is under production. This system can be used for seismic pumping operations where sensors have to be positioned in one or more wells. Other applications in which such a receiver system can be used include ground surveillance, surveillance of permanent structures or storage cavities, etc., or possibly detecting seismic activity or earthquakes. More generally speaking, the improved receiver system which is the object of this invention can be used in all activities in which acoustic signals have to be picked up in a frequency band up to several thousand hertz.

A sonde incorporating a receiver system is known from document U.S. Pat. No. 5,259,452 but the way in which this system is coupled with the well walls is not as good as it could be.

SUMMARY OF THE INVENTION

The present invention, therefore, relates to a device for coupling a receiver system with the wall of a well bored in the ground and the system has at least one sensor sensitive to vibrations and means arranged at the two ends of the said system for applying the system against the well wall. A surface by which the system is supported against the wall, arranged between the said application means, has a radius of curvature essentially identical to the radius of curvature of a transverse section of the well so that the contact surface between the system and the wall follows a portion of cylinder contained within an arc of at least 90°.

The means for applying the device may be magnets.

The magnets may be mounted on the body of the system so a gap ranging between 1 and 3 mm is created between the magnets and the well wall.

The means for applying the device may be electromagnets.

The means for applying the device may be telescopic arms.

Depending on the direction in which the sensor is taking measurements, the axis may intercept the contact surface.

Two sensors may be arranged in a same section in directions perpendicular to one another.

The sensors may be of the geophone and/or accelerometer type.

The receiver system may be between 30 and 50 cm in length and its transverse direction may be between 40 and 50 mm.

The present invention will be more readily understood and its advantages clearer from the following description of examples, which are not restrictive in any respect, illustrated by the accompanying drawings, in which:

BRIEF DESCRIPTION OF DRAWINGS

FIG. 1 is a schematic illustration of a measuring unit having a coupling device of the invention for the receiver system.

FIGS. 2a and 2b show the coupling device in section.

FIG. 3 illustrates how the invention is implemented.

DETAILED DESCRIPTION OF DRAWINGS

Figure 4A:
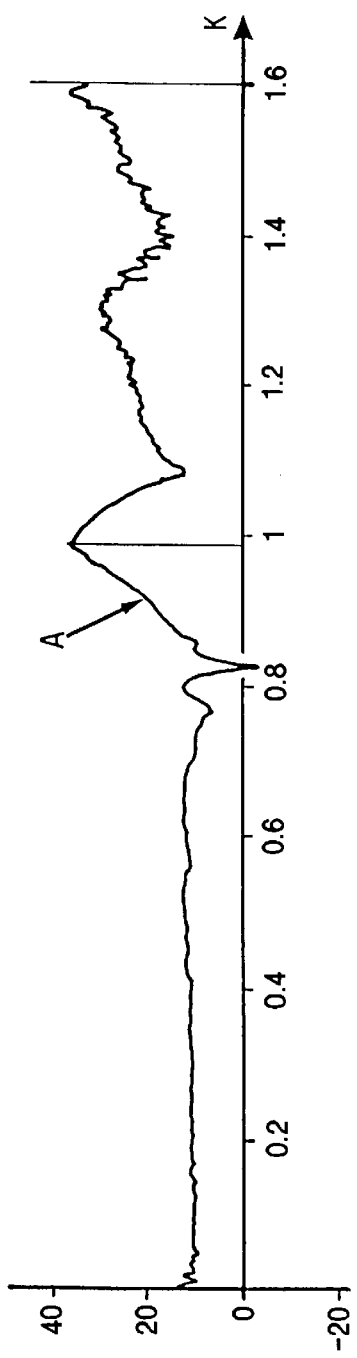
FIGS. 4A and 4B illustrate comparative tests conducted on various receiver systems.

FIG. 1 is a schematic illustration of a measuring sonde which can be lowered into a well 1, which may or may not be lined with a metal casing. This sonde comprises three parts, for example: an electronic part 2, an uncoupling device 3 and a receiver system 4 having at least one array of sensors which must be correctly coupled with the geological formation through which the well was drilled. The present invention relates mainly to the system by which part 4 is coupled with the wall of the well 1. The other parts are comparable to those described in document U.S. Pat. No. 5,259,452, cited here as a reference.

The electronic module 2 may contain pressure and temperature sensors 5, electronic transmission means 6 for sending the measurements back to the surface via the conductors channel contained in the logging cable 7 and motor means 8 for operating a telescopic arm 9 designed to apply the electronic module 2 against the wall of the well. In the more common case, where the well is lined with a metal casing, a magnet system 10, either permanent or of the electro-magnet type, may adjoin the arm 9. A description will not be given here of the mechanical uncoupling device 3, the functions and design of which are described in document U.S. Pat. No. 5259452.

The receiver system 4 of the invention has sensor means which have to be coupled with the formation as perfectly as possible. These may be three directive geophones 11, the axes of which are oriented respectively in three orthogonal directions, a tri-axial geophone or alternatively four geophones regularly oriented in space. They may be adjoined by three accelerometers 12, the axes of which are also oriented in three orthogonal directions. In general, the receiver system has in addition a pendulum 13, which is used to measure the inclination of the well at the point of measurement. Arranged essentially at the two ends of the receiver system are means 14 and 15 for applying the said system against the wall of the well.

FIG. 2a shows a section along AA (FIG. 1) of the body of the receiver system between the application means 14 and 15. Line 16 represents part of the wall of the well, which may or may not have a casing. The section of the body of the receiver system 4 consists of a portion of cylinder 17 extended by two tangent planes 18 joined at M and N on a surface having the same radius of curvature as that of the well 1, so that the receiver system 4 is in contact with the well wall across the entire length of the arc MN. The length of the line MN may be essentially the same as the diameter of the cylindrical part of the body of the receiver system, in which case the planes 18 are essentially parallel, but it would not be a departure from the scope of the present invention if the said length were greater than the diameter, which would increase the length of the arc MN. The directions 19 and 20 therefore represent two orthogonal directions of the directional sensor means intercepting the wall of the body 4 on the contact zone (arc MN) between the said body and the wall of the well which will provide a very significant improvement in the coupling of the sensors arranged along these directions.

FIG. 2b shows an embodiment of the application means 14 and 15 as used in the most commonly found situation where the well 1 is lined with a metal casing. The solution illustrated in FIG. 2b shows the magnetic application means, which are provided in the form of two permanent magnets, made from samarium/cobalt for example, arranged so that the lines of the magnetic field are closed across the casing tube 23. A piece of soft iron 24 closes the field lines in the body of the receiver system and extension pieces 25 and 26, also of soft iron, provide a gap of approximately 1 to 3 mm with respect to the casing 23. The body of the receiver system is therefore essentially continuously supported between the two points of application 14 and 15, the latter not being in direct contact with the wall of the casing so that the application force applied by each magnet will enhance the support for the part of the body containing the sensor means.

Clearly, the invention may be implemented by other application means, such as electromagnets, for example, or by remotely controlled arms in accordance with the principle described in document U.S. Pat. No. 4,898,237 cited here as a reference.

As an example, the dimensions of the receiver system may be as follows: between 35 and 50 cm in length, of a transverse size ranging between 42 mm and approximately 50 mm, and having a radius of curvature ranging between 85 and 90 mm for the contact surface. A sonde of this type may be lowered inside a production string of a nominal dimension of 2 7/8 (73.025 mm).

Tests have been conducted to compare the frequency response of a receiver system of the prior art (fully cylindrical) and that of the present invention.

The two receiver systems are applied in succession inside a length of metal tubing suspended by elements which filter the vibrations. A frequency acquisition and analyser system is used, incorporating an impact hammer manufactured by Bruël et Kjaer (technical file 8202). The single tube has an inherent natural resonant frequency, due to its geometric characteristics, of F=986 Hz.

Figure 4B:
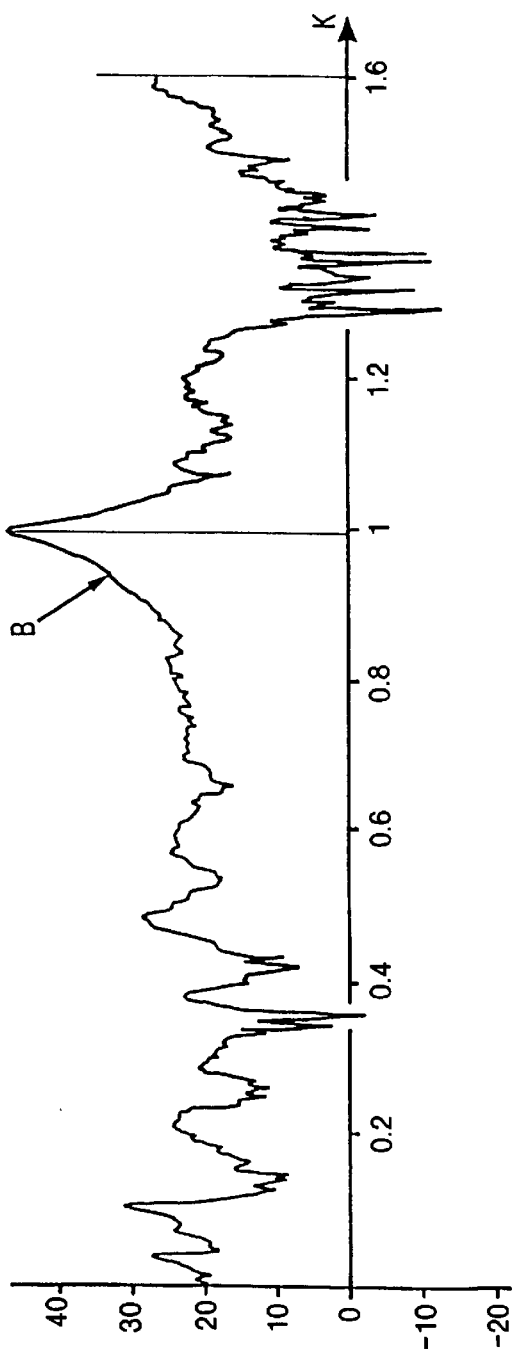

The frequency responses are illustrated in FIG. 4(a,b) where the abscissa represents the frequency in kilo Hertz and the ordinate the amplitude. The two curves A and B show the frequency response of a directional accelerometer positioned along the direction indicated by reference 19 in FIG. 2a, for a receiver system of the invention (section illustrated in FIG. 2a) and for a receiver system of the prior art (cylindrical body) respectively.

It is clear that the curve A indicates essentially no response for frequencies below the resonant frequency of the tube (approximately 986 Hz), in contrast with the curve B of the system representing the prior art.

FIG. 3 illustrates an embodiment of a sonde consisting of an electronic module 2 and a receiver system of the invention 4 suspended from a power cable 7, maneuvered by means of a derrick 31 and a winch electrically connected to the measuring unit 32. The well 1 is fitted with a production string 30 having an annular sealing means 33 of the packer type at its lower part. The sonde is lowered into the space inside the string 30 until it reaches the zone 34 where the receiver system is coupled with the formation as described above. By preference, the sonde is provided with a weight in the form of load bars so that it can be lowered by force of gravity. In certain instances, particularly in the case of sharply inclined wells, the power cable is replaced by a coiled tubing having a cable fitted with conductors in order to push the sonde, along a horizontal section, for example. It would not be a departure from the scope of the present invention if other known methods were used to propel the sonde along the well.

We claim:

1. A device for coupling a receiver system (4) with the wall of a well (1) bored in the ground, said system having at least one sensor (11; 12) sensitive to vibrations, magnets (14, 15) for applying said system against the wall of said well arranged at the two ends of said system mounted on the body of the system so as to create a gap ranging between 1 and 3 mm between the poles (25, 26) of the magnets and the wall (23), a surface of the system supported against the wall arranged between the said magnets having a radius of curvature essentially identical to the radius of curvature of a transverse section of the well so that the contact surface (MN) between said system and the all is along a portion of a cylinder contained in an arc of at least 90°.

2. A device as claimed in claim 1, in which the magnets are electromagnets.

3. A device as claimed in claim 1, in which the axis (19, 20) along the measuring direction of said sensor intercepts said contact surface.

4. A device as claimed in claim 3, in which two sensors are arranged in a same section and their directions are perpendicular.

5. A device as claimed in claim 1, in which the said sensors are of the geophone and/or accelerometer type.

6. A device as claimed in claim 1, in which the said receiver system ranges between 30 and 50 cm in length and has a transverse dimension of between 40 and 50 mm.

7. A device as claimed in claim 2, in which the axis (19, 20) along the measuring direction of said sensor intercepts said contact surface.

8. A device as claimed in claim 2, in which the said sensors are of the geophone and/or accelerometer type.

9. A device as claimed in claim 7, in which the said sensors are of the geophone and/or accelerometer type.

10. A device as claimed in claim 2, in which the said receiver system ranges between 30 and 50 cm in length and has a transverse dimension of between 40 and 50 mm.

11. A device as claimed in claim 7, in which the said receiver system ranges between 30 and 50 cm in length and has a transverse dimension of between 40 and 50 mm.

12. A device as claimed in claim 9, in which the said receiver system ranges between 30 and 50 cm in length and has a transverse dimension of between 40 and 50 mm.

13. A device as claimed in claim 7, in which two sensors are arranged in a same section and their directions are perpendicular.

14. A device as claimed in claim 9, in which two sensors are arranged in a same section and their directions are perpendicular.

15. A device as claimed in claim 11, in which two sensors are arranged in a same section and their directions are perpendicular.

* * * * *